Nov. 28, 1967 G. A. GIANNUZZI 3,354,816

LINE PRINTER WITH PROPORTIONAL SPACING CONTROL MEANS

Filed Sept. 19, 1966 5 Sheets-Sheet 1

INVENTOR
GEORGE A. GIANNUZZI

BY Francis V. Giolma
ATTORNEY

Nov. 28, 1967 G. A. GIANNUZZI 3,354,816

LINE PRINTER WITH PROPORTIONAL SPACING CONTROL MEANS

Filed Sept. 19, 1966 5 Sheets-Sheet 3

Nov. 28, 1967 G. A. GIANNUZZI 3,354,816

LINE PRINTER WITH PROPORTIONAL SPACING CONTROL MEANS

Filed Sept. 19, 1966 5 Sheets-Sheet 4

| CHARACTERS | d | i | s | c | l | o | s | u | r | e | | … |
|---|---|---|---|---|---|---|---|---|---|---|---|---|
| SPACE UNITS OF CHARACTER | 4 | 3 | 3 | 4 | 3 | 4 | 3 | 4 | 3 | 4 | | |
| LOCATION FROM DATUM LINE PROGRESSIVE TOTAL | 0 | 4 | 7 | 10 | 14 | 17 | 21 | 24 | 28 | 31 | 35 | |

TOTAL WORD LENGTH → $\frac{-1}{34}$

FIG. 5

| | HAMMERS | 1 | 2 | 3 | 4 | 5 | 6 | 7 | … | 150 |
|---|---|---|---|---|---|---|---|---|---|---|
| | PROPORTIONAL STORAGE ADDRESS POSITION | 0 | 1 | 2 | 3 | 4 | 5 | 6 | | 149 |
| PROPORTIONAL STORAGE BANK ADDRESS (PARTIAL LINE PRINT CYCLE) | DISPLACEMENT FROM DATUM | | | | | | | | | |
| A0 | .000 | $0_d$ | 5 | $10_c$ | 15 | 20 | 25 | 30 | | 745 |
| A1 | .020 | 1 | 6 | 11 | 16 | $21_s$ | 26 | $31_e$ | | 746 |
| A2 | .040 | 2 | $7_s$ | 12 | $17_o$ | 22 | 27 | 32 | | 747 |
| A3 | .060 | 3 | 8 | 13 | 18 | 23 | $28_r$ | 33 | | 748 |
| A4 | .080 | $4_i$ | 9 | $14_l$ | 19 | $24_u$ | 29 | 34 | | 749 |

SPACE UNITS TOTALS & CHARACTER CODE DISTRIBUTION

FIG. 6

3,354,816

LINE PRINTER WITH PROPORTIONAL SPACING CONTROL MEANS

George A. Giannuzzi, Vestal, N.Y., assignor to International Business Machines Corporation, Armonk, N.Y., a corporation of New York Filed Sept. 19, 1966, Ser. No. 580,323
8 Claims. (Cl. 101—93)

This invention relates generally to printing, and it has reference in particular to proportional spacing of characters in printing.

Generally stated, it is an object of this invention to provide for spacing the different characters in a line of print in accordance with the various widths thereof.

More specifically, it is an object of this invention to provide, in a printer having a print line with a plurality of print positions, for alloting each character a definite space width, and for effecting relative movement of the document and print mechanism to permit printing the individual characters in allocated positions according to their cumulative character space width values from the beginning of the line to the space to be occupied by each particular character.

Another object of the invention is to provide in a chain/train printer for alloting the characters in a line of print definite space width values, cumulating the space width values for the characters, and moving the document relative to an initial position different amounts so as to print the characters at locations spaced in accordance with the cumulative totals of their individual space width values.

Yet another object of this invention is to provide in a chain/train printer for assigning characters in a line of print discrete space width values, totaling the space width values, and entering the characters into locations in a proportional print buffer storage in accordance with their cumulative space width values, effecting a compare between groups of characters in the proportional print buffer storage and on the print chain to activate selected print hammers, and effecting advance of the document discrete distances from a reference location, in sequence.

It is also an object of this invention to provide in a chain/train printer for storing a line of data to be printed, together with character space width data for each character, and providing for partial line printing of characters by scanning the data and space width storage to load a proportional print buffer with a group of characters having a first pre-determined cumulative space width relation relative to a reference line, causing the contents of the proportional print buffer to be printed, and then reloading the buffer with an additional group of characters having a second common cumulative space width relation.

Another object of the invention is to provide in a printer for using a data buffer storage device for storing coded representations of characters to be printed in a print line, together with individual character space width data for each character, reading data from the data buffer into a proportional print spacing buffer in accordance with a cumulative value of the space widths of preceding characters, reading out the data in the proportional spacing buffer to obtain a compare with a character on a print chain/train for the print position, and periodically advancing the position of the document relative to the chain/train to print characters in positions in accordance with the cumulative values of their print space width positions in the print line.

Yet another object of ths invention is to provide for using off-set type elements for extra-wide characters in a printer and for storing modifier bits with the coded representations, in addition to the associated space width values for such characters, which modifier bits are used to advance a cumulative space width counter in addition to the regular advancement by the character width space value, for delaying printing of the extra-wide character until the document has been incremented to the next discrete document position from that in which the character would otherwise have been printed.

In practicing the invention in accordance with a preferred embodiment, coded representations of characters to be printed in a line of print on a document by a chain/train printer are loaded sequentially into a data buffer storage device in the usual manner along with data representative of the individual space width of each character. A proportional print storage buffer is provided having for example, based on a maximum character width of five space units, 150 five-unit space width storage positions. A space units counter is used to total the cumulative space-width units of the characters in partial print line operation, and coded representations of characters are stored in each position of the proportional print storage for which there is a character having a cumulative space width total which is a multiple of five, from a reference line such as the left margin (or "zero" units position), the units counter being advanced for each character scanned by an amount equal to the space widths units of the particular character. When the entire data buffer has been scanned, the proportional print buffer is read out, and the proper print hammers are activated in response to a compare between the character on the chain in a given print position and the corresponding character in the proportional print space buffer. At the end of a first data buffer scan and proportional print buffer readout, a cam shift drive is activated to advance the document one space unit to the left, and then the data buffer is scanned again and the proportional print buffer is loaded with characters having cumulative space-width units totals which are a multiple of five from the "one" units positions. This cycle is repeated with a shift cam ring being advanced each time, and the document being advanced one space unit to the left for each partial line completion, until five partial print line operations are completed, whereupon a signal is provided to advance the carriage to prepare for the next print line and reset the proportional print spacing circuit to provide for a similar operation with respect to the following print line.

The foregoing and other objects, features and advantages of the invention will be apparent from the following more particular description of preferred embodiments of the invention, as illustrated in the accompanying drawings.

In the drawings:

FIGURE 5 is a table showing the application of the space units data in determining the location of a character from a datum or margin line for a typical application;

FIGURE 6 is a table illustrating the locations of character representations in the proportional print storage buffer for a typical application;

Figure 1:
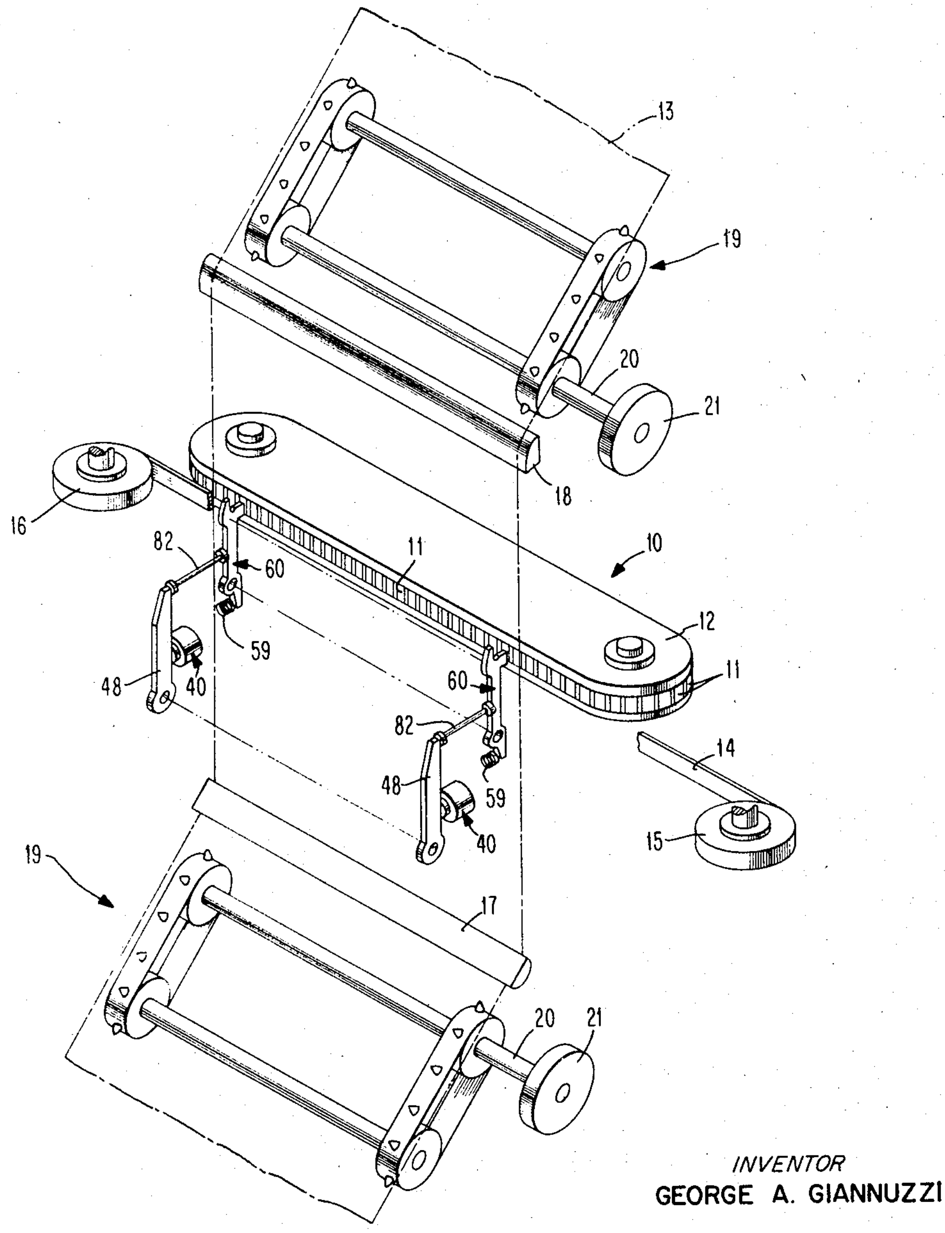
FIGURE 1 is a schematic showing of a printer mechanism of a type with which the invention may be used.

Referring particularly to FIGURE 1 of the drawings, there is shown a printer apparatus of a type such as described in detail in Patent No. 3,241,480 which issued Mar. 22, 1966 to J. M. Cunningham, entitled "Print Hammer Mechanism and Pressure Control Means in High Speed Printers." As shown the printer comprises a type carrier 10 having a plurality of individual type elements 11 movable in a continuous path on a stationary frame 12. A portion of the path of motion of the type elements 11 includes a straight portion along which printing can occur and which hereinafter is referred to as the print line. Each type element 11 has one or more different engraved characters on the front surface thereon. Plural sequences of type characters are obtained by assembling the type elements in pre-determined arrangements on the frame 12. The type elements 11 are driven preferably in the form of a chain/train along the frame 12, so that they travel at a constant velocity and are maintained in fixed relation along the front straight print line portion of the path of travel. The specific construction of the drive means and the connection of the type elements thereto as well as details of construction of the movement of the type elements 11 in the closed path may be more fully understood by a reference to Patent No. 3,224,366 entitled "Type Character Device" which issued on Dec. 21, 1965, and is assigned to the assignee of this application. The printer apparatus of FIGURE 1 is a back-printer and in accordance with well-known operational principles thereof a paper document 13 is positioned behind an ink ribbon 14, or the like, which in turn is positioned immediately adjacent the type elements 11 along the print line thereof. The ink ribbon 14 may be fed in a suitable manner between spools 15 and 16 along the line of travel of the type elements. The paper document 13 however is generally fed transversely to the direction of motion of the type. Guide bars 17 and 18 and forms feed tractors 19 co-act to transport and move the paper document in the proper line of travel. In the preferred form, printing occurs while the paper 13 is stationary relative to the print line. On completion of a print cycle, paper 13 is advanced one or more line spaces in response to a print control signal where the new line of data may be printed. Means for feeding the paper 13 in synchronism with operation of the print mechanism are well-known and would include a drive motor, not shown, or the like, connected to shaft 20 by means of pulleys 21 or the like of the feed tractors 19.

In printer apparatus of FIGURE 1 in accordance with the principles of back-print, printing occurs when the paper 13 and ink ribbon 14 are impacted against the type characters on the type element. The impacting occurs at various printing positions along the print line to thereby form a complete line of data. For this purpose a plurality of print hammers 60 are mounted behind the print medium 13. Print hammers 60 are arranged to be uniformly spaced so that one hammer element occupies one position along the print line and the hammers 60 are aligned along a single row parallel to the print line. Each print hammer 60 is part of an individual hammer unit which comprises an electromagnet 40 with armature 48, and a push rod element 82 with bias springs 59 which maintain the hammers 60 out of contact with the paper 13 when the electromagnet is de-energized. Each hammer 60 is individually operable, and the operation of various hammers occurs selectively at random along the print line in accordance with instructions from a control which comprises a type tracking device, and a coacting storage device which indicates the data to be printed. Further details on a suitable control system may be more fully understood by reference to U.S. Patent No. 2,933,437 to F. M. Demer and E. J. Grenchus for a "High Speed Printer Apparatus" issued July 25, 1961, and a U. S. Patent 3,066,601 to H. E. Eden for "Error Checking Devices" issued Dec. 4, 1962, both assigned to the assignee of this application.

In order to provide for editing a line of data to be printed, it is possible to program the operation of the system so that the code for each character in the line can be relocated, before printing, in an intermediate storage device so as to relate directly to a datum or reference line "0" (or left margin), to a datum line on the type slug (the edge of the left-most stroke), and to the units of space required for each character of varying width. If we consider a set of characters with a normal overall space width of .080 inch (and a character width of .060 inch), with the exception of the letters f, i, j, l, r, s, and t (which would have a space width of .060 inch and a character width of .040 inch), and the letters w and m (which would have a space width of .100 inch and a character width of .080 inch), the normal characters could then be designated as four-unit characters (four times .020 inch) the second group as three-unit characters (three times .020 inch), and the third group as five unit characters (five times .020 inch), .020 inch being the unit of space width.

To proportionally space such characters of different widths, it is advantageous to provide for discrete relative movement along the print line between the document and the print hammers, in distances equal to the unit of space width (.020 inch). Such relative movement may be affected in several ways, such as by shifting the entire hammer and magnet unit, shifting the document forms feed tractors, or shifting the ends of the push rods nearest the type hammer in those mechanisms in which the hammers are mounted on the same carrier of and travel with the type elements.

Figure 2:
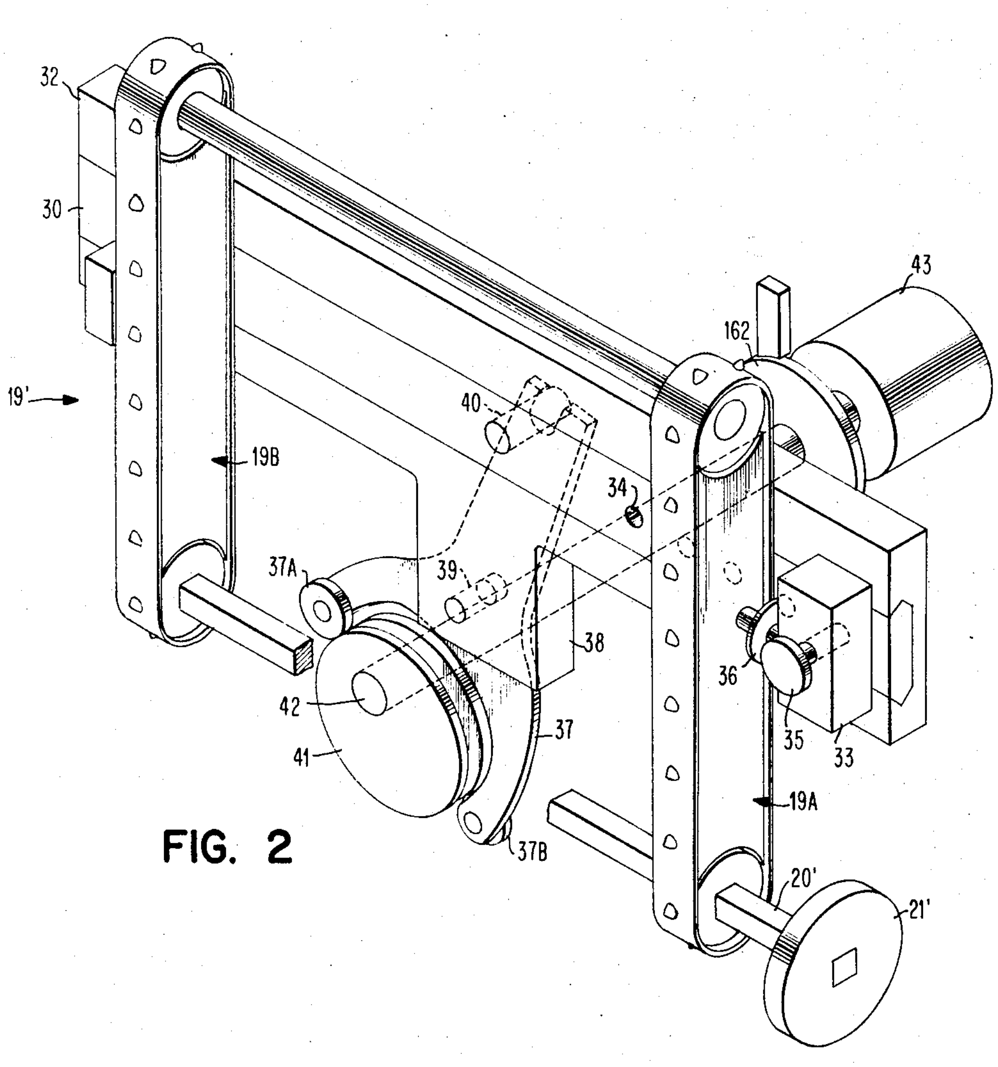
FIGURE 2 is a schematic showing of a carriage shift mechanism which may be used with one embodiment of the invention.
Figure 3A:
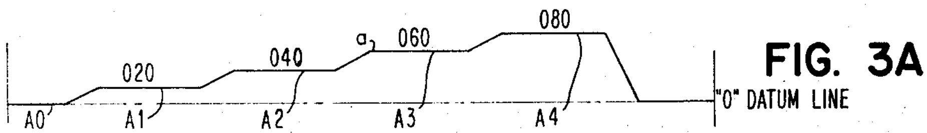
FIGURES 3A, 3B and 3C are diagrams showing schematically different arrangements of cam levels which may be used with the shift mechanism of FIGURE 2.
Figure 3B:
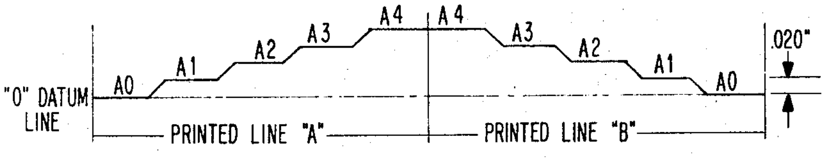
Figure 3C:
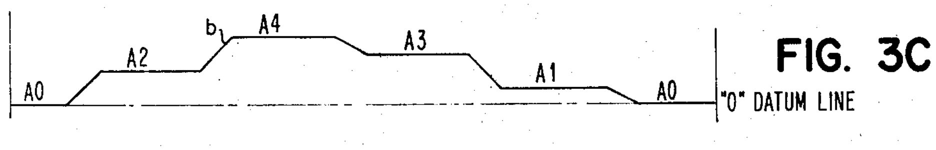

Referring to FIGURE 2 of the drawings, it will be seen that a forms feed tractor 19′ may comprise right and left-hand tractor assemblies 19A and 19B for advancing the document under the control of a square drive shaft 20′ and means such as the pulley 21′. The left-hand tractor assembly may be rigidly secured to a slide 30 which is slidably supported in a tie-bar 32 which may be suitably secured to the frame of the printer. The right-hand tractor assembly 19A may be adjustably secured to the slide 30 being connected to a support 33 which is positionable at different locations on the slide by means of holes 34 for receiving an end of a thumb screw 35. A vernier screw adjustment 36 may be used to connect the tractor assembly 19A to the support 33 for effecting relatively fine positional adjustments. The slide bar 30 is actuated longitudinally by means of a cam lever 37 which is pivotally supported on an extension 38 of the tie-bar 32 by means of a pivot pin 39, and is coupled to the slide 30 by means of a pin 40. A cam 41 mounted on a shaft 42 is activated discrete angular amounts by means of a stepping motor 43 to rock the lever 37 about the pivot 39 and move the slide 30 discrete distances in accordance with the position of the cam 41. By providing the surface of the cam 41, which is engaged by followers 37A and 37B on forked extensions of the lever 37, with a contour having either stepped surface portions generally in accordance with the outline shown by the curve "*a*" in FIGURE 3, or continuously sloping surface portions providing similar differential differences from the datum line in each of the ranges A0 through A4 as shown, the tractor assembly and hence the document 13 may be moved in intervals which are multiples of .020 inch for specific rotational positions of the stepping motor 43. Instead of utilizing a progressively stepping arrangement as shown in FIGURE 3A, different arrangement of cam surface levels may be utilized, such as for example, the alternate form as shown by the curve "b" in FIGURE 3C where the levels are first progressively increasing and then progressively decreasing to return to the initial position, or by the curve of FIGURE 3B in which the shift progressively advances in four steps of .020 inch in one direction while printing five partial prints for printed line "A" on the document and progressively recedes in four steps of .020 inch in the opposite direction for printed line "B."

Figure 4:
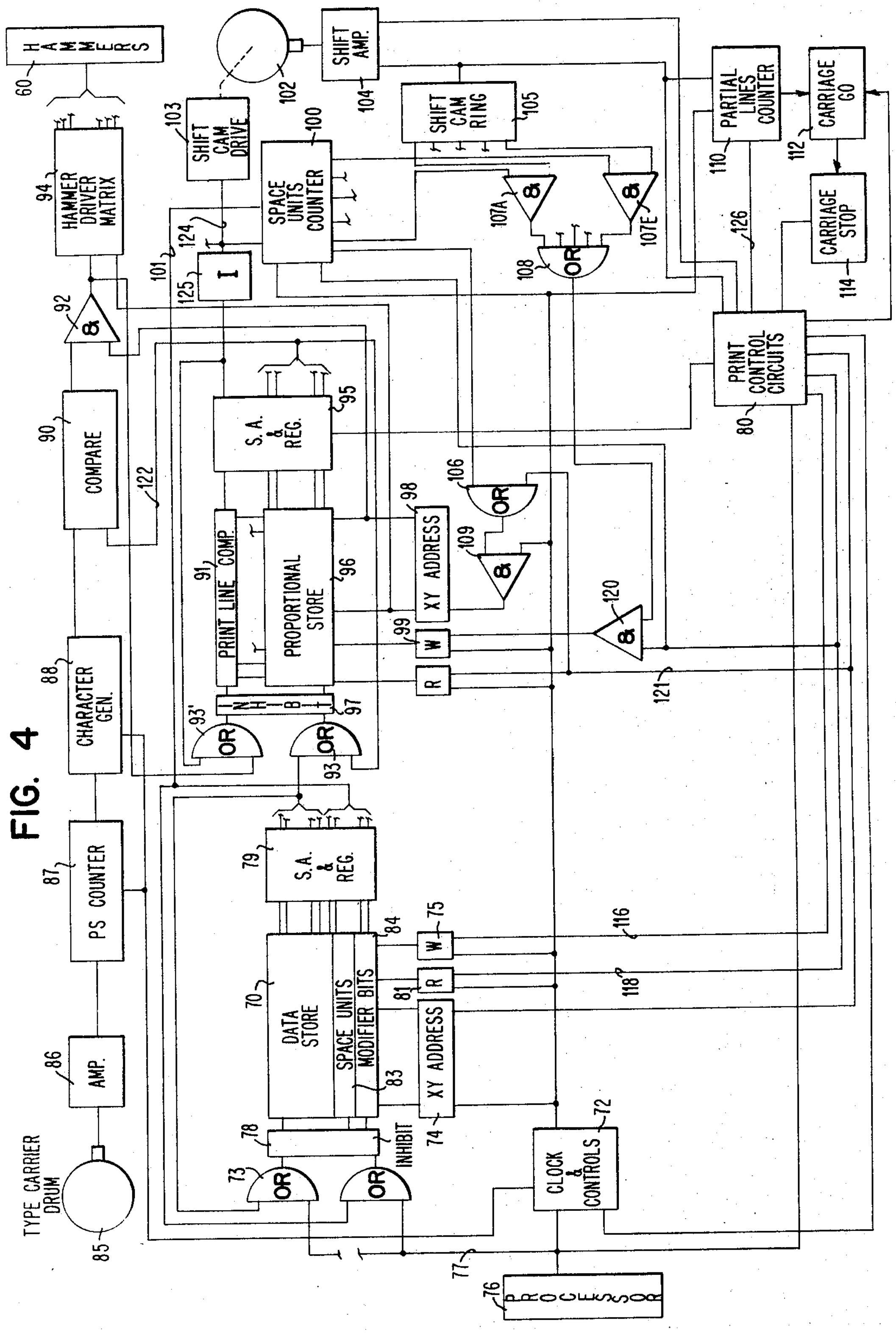
FIGURE 4 is a schematic block and line diagram showing an arrangement of controls for a chain-train printer embodying the invention.

Referring to FIGURE 4 it will be seen, as shown in the Eden patent, that data to be printed may be stored in a multi-plane core data storage 70 under the control of clock and controls 72 through the operation of X–Y address rings 74 and write drivers 75, the data being supplied from a processor 76 or the like, over imput lines represented by the single flow line or conductor 77 through OR circuits 73 and the usual inhibit registers 78, which are also used to control regeneration, in response to a load buffer signal from the print controls 80. In addition to the normal data storage 70, additional core planes are provided for storing character space width values and space modifiers in core planes 83 and 84 respectively, this data being written into the core planes at the same time the data to be printed is written into the data storage 70. Sense amplifiers and registers 79 are provided for readout under the control of read drivers 81.

The type chain 11 is provided with a type carrier drum 85 for producing pulses which are amplified by an amplifier 86 for operating a pulse scan counter 87 and a character generator circuit 88 for producing signals representative of the characters on the chain at the different locations thereon. The output signals from the character generator 88 are supplied to a compare circuit 90 and thence through an AND circuit 92 for effecting operation of the print hammers 60 through a hammer drive matrix 94.

Instead of comparing the output signal from the character generator with the character representations as read out of the data storage 70 through sense amplifier 79 in the manner described in the Eden and Demer patents, the data storage 70 is scanned and the different characters to be printed are first read out of storage 70 through OR circuits 93 and arranged in a proportional print core storage 96 where they are positioned in accordance with the cumulative value of the space width values of the preceding characters.

The transfer of data from data storage 70 into proportional print storage 96 is through control of X–Y address rings 98 by a space units counter 100 which is operated by a read-out from the character space units storage 83 over conductor or line 101, and through control of a write switch 99 by the space units counter 100 and the shift cam ring 105. The space units counter counts to five, and its carry-over output advances the X–Y address rings through OR 106 and AND 109 by one position for each five units of space as the counter accumulates the character space width values. The cam shift mechanism of FIGURE 2 is provided with a cam disc 102 which produces pulses through amplifier 104 indicative of the shift position of the mechanism (A0 through A4). The output of the amplifier controls cam shift ring 105 which counts the cam shift position, and through a plurality of AND circuits 107A through 107E and OR circuit 108 controls the operations of write switch 99, so that on successive partial line print cycles, only characters having cumulative space width units totals of 0, 5, 10 etc. will be written into proportional storage on the first partial line print cycle; characters having cumulative space width units totals of 1, 6, 11 etc. on a second—through five such operations to include all the possible characters to be printed in a line. Sense amplifiers and registers 95 are provided for readout to compare 90 and for regeneration through OR's 93 and 93' and inhibit registers 97. A print line complete core plane 91 provides a control to the shift cam stepping motor 43 to advance the shift cam drive 103 at the completion of each partial line print cycle. A partial lines counter 110 is operated from the amplifier 104 for providing signal to a carriage go circuit 112 on a count of five, for effecting advance of the carriage under the control of the print controls, provided that a carriage stop circuit 114 is not activated.

In a printing operation, character representation of characters to be printed in a print line are written into the data storage 70 in a manner described in the Eden patent hereinbefore referred to, and their space width values are likewise written into the storage 83, in response to information from a processor 76, under the control of the address rings 74 and the write switch 75, in response to a signal from the print controls 80 over line 116. When the data storage is filled, readout occurs under the control of the address rings 74 and the read switch 81 in response to a signal from the print controls circuit 80 over line 118. During the first partial line print cycle A0, as each position of the data storage 70 is scanned, the proportional print storage 96 is addressed by address rings 98 under control of the space units counter carry-over, for each five units of space, as described. Write switch 99 is controlled to operate through AND circuit 120 and OR circuit 108 only when the cumulative total indication in the space units counter 100 equals a corresponding indication in the shift cam ring 105, as determined through AND circuits 107A through 107E. Since the initial setting of the space units counter 100 is zero, as is the initial position of the space cam ring 105, the first character in this instance "d" will be written into the first or "0" position of the proportional print storage. At the same time its space width value of four is added to the space units counter 100, advancing it to a count of four. When the second character in the data storage 70 is scanned, the cumulative total of the space units counter will be at four while the shift cam 105 is still at zero, so the write switch 99 is not activated and the "i" is not written into the proportional print storage 96. Likewise, when the third position of the data storage 70 is scanned the "s" will not be written, since the space units counter 100 will now contain a total of seven (or a "2"), the value of three for the "i" having been added to the four for the "d." This pattern is repeated for a complete scan of the data storage 70 and, as will be seen from the table in FIGURE 7, only the "d" and the "c" will be stored in the proportional print storage on the first scan of the data storage. The scan of the data storage 70 is completed, either by a signal from the last address of the address ring 74 or by means of a timed impulse; then the print controls 80 may be activated to provide a signal over conductor 121 to read out the characters in the proportional print storage 96, through sense amplifiers and register 95. The output of the register 95 is applied to the compare circuit 90 over conductor 122, so as to provide a signal through AND circuit 92 to the hammer drive matrix 94 for operating the print hammers 60 selectively, upon a compare between the character in the proportional print storage 96 and a character representation on the chain/train and indicated by the output of the character generator 88.

As each character representation is read out of the proportional print storage 96 and printed, a bit corresponding to the position in which the character was written is changed from a "1" to a "0" in the print line complete plane 91 so that a readout of the print line complete storage plane 91 at the end of a partial print line scan of proportional print storage will result in a "0" output when all the characters stored therein have been printed. This output signal is utilized such as through an inverter 125 to reset the space units counter 100 over conductor 124 and actuate the shift cam drive 126 to advance the stepping motor 43 and move the document .020 inch to the left. Advancement of the document by the shift cam drive 103 causes the shift cam disc 102 to produce an output pulse which advances the shift cam ring 105 to the "1" position, and advances the partial line counter 110 to indicate that the A1 address cycle is to be effected. The print control circuit 80 in response to a signal from partial lines counter 110 over conductor 126 activates the address ring 74 of the data storage 70, and a second complete scan of the data storage 70 is effected in the same manner as described hereinbefore. All character positions are scanned, and since the shift cam ring 105 is now in the "ones" position, only characters having cumulative space width values of "1," incremented by multiples of five, will be written into the proportional print storage 96. Accordingly, for the second partial print line operation, it will be seen from FIGURE 7 that only the small "s" and "e" will be written into the proportional print storage 96 since they have cumulative space units values of 21 and 31 respectively. The proportional print storage 96 is thereafter read out in response to a signal from a print control 80 over conductor 121 and the characters in the proportional print storage are printed in the manner as described hereinbefore. The shift cam drive 103 is again activated, and the space units counter 100 is reset in response to readout of the print line complete storage 91. This operation is repeated for A2, A3 and A4 partial line print cycles in turn until all the characters in the data storage 70 are printed. When the partial lines counter 110 reaches a count of five, a signal is supplied to the carriage go circuit 112 for effecting advance of the carriage to the next print line, under control of the print controls 80.

An alternate method of storage permits data storage 70 to be of standard configuration without having to provide additional planes for character space width storage 82 and modifier bits storage 84; nor will the codes for the latter have to be supplied from an original source along with the character codes; instead, these codes may be initially loaded into a separate, addressable storage device of standard configuration. During a scan of the data storage 70, each character code, as it is read out, addresses and locates its own space width value and modifier bits (if any) which are entered into the space units counter 100 which, functioning as hereinbefore described, will control the X–Y address ring 98 and the write switch 99 of proportional space storage 96 to permit entry of the character code during the proper partial print cycle A0 through A4, as hereinbefore described.

Instead of 150 storage positions in the proportional print storage 96, as described previously, 750 storage positions could be provided to effect the transfer of data from data store 70 with only one scan of the latter and the Print Line Complete plane 91 would have a similar number of positions. In this case, address ring 98 becomes an X–Y–Z addressing device, with the five Z lines (for banks A0 through A4) being activated directly by the five output lines (for progressive space units totals of 0, 1, 2, 3 and 4) from the space units counter 100 and with the X–Y axes activated by the counter carry-over, as before described, thereby selecting one of the 750 storage positions as each progressive cumulative total is reached. During readout from proportional print storage 96 to compare and print, the Z axis of X–Y–Z address ring 98 will now be under direct control of the shift cam ring 105 which needs no longer control the write switch 99, and the X–Y axes will scan in a normal manner, from 1 through 150, for each position of ring 105 and each of partial print cycles A0 through A4.

With the above arrangement, though the incremented shift cam drive may be used as hereinbefore described, the shift cam 41 could be driven continuously by any suitable means. The dwells of the cam, for each partial line print time, must be of sufficient time duration to permit all available different type element characters of the chain/train to pass by each print hammer position and, therefore, for the character generator 88 to complete its full cycle.

Since the shift cam is continuously driven and the incrementing drive 103 is eliminated, the print line complete plane 91 of proportional print store 96 in which a "1" is entered for each character entered into proportional store 96 and is erased wherever a compare is made for the character as described in Eden, can now be used to indicate that all characters stored in selected positions 1 through 750 will have printed out sometime during the five partial line print times A0 through A4. In this instance the cam shift disc 102 would be provided with two marks for each cam position, the first for operating the cam shift ring 105 to indicate the next cam level, and the second mark at the end of document motion for permitting print scans to resume as data is available in any of the banks A0 through A4 of the proportional print storage. Printing would be considered asynchronous to the extent that should the partial print line A0 be not completely printed out by the time a cam shift starts, the cam would nevertheless continue its revolution to proceed with the partial lines A1 through A4. At the end of partial line A4, the carriage would be relocated and the line space or carriage go signal suppressed, because with partial line A0 not having been completely printed, the line complete plane is not clear to emit a line complete signal. Then during a portion of what should be partial line B0 (for the second of B line of the document data) the remainder of partial line A0 is printed. The line complete signal will now be available so that a line space can occur.

Figures 7, 8, 9, 10:
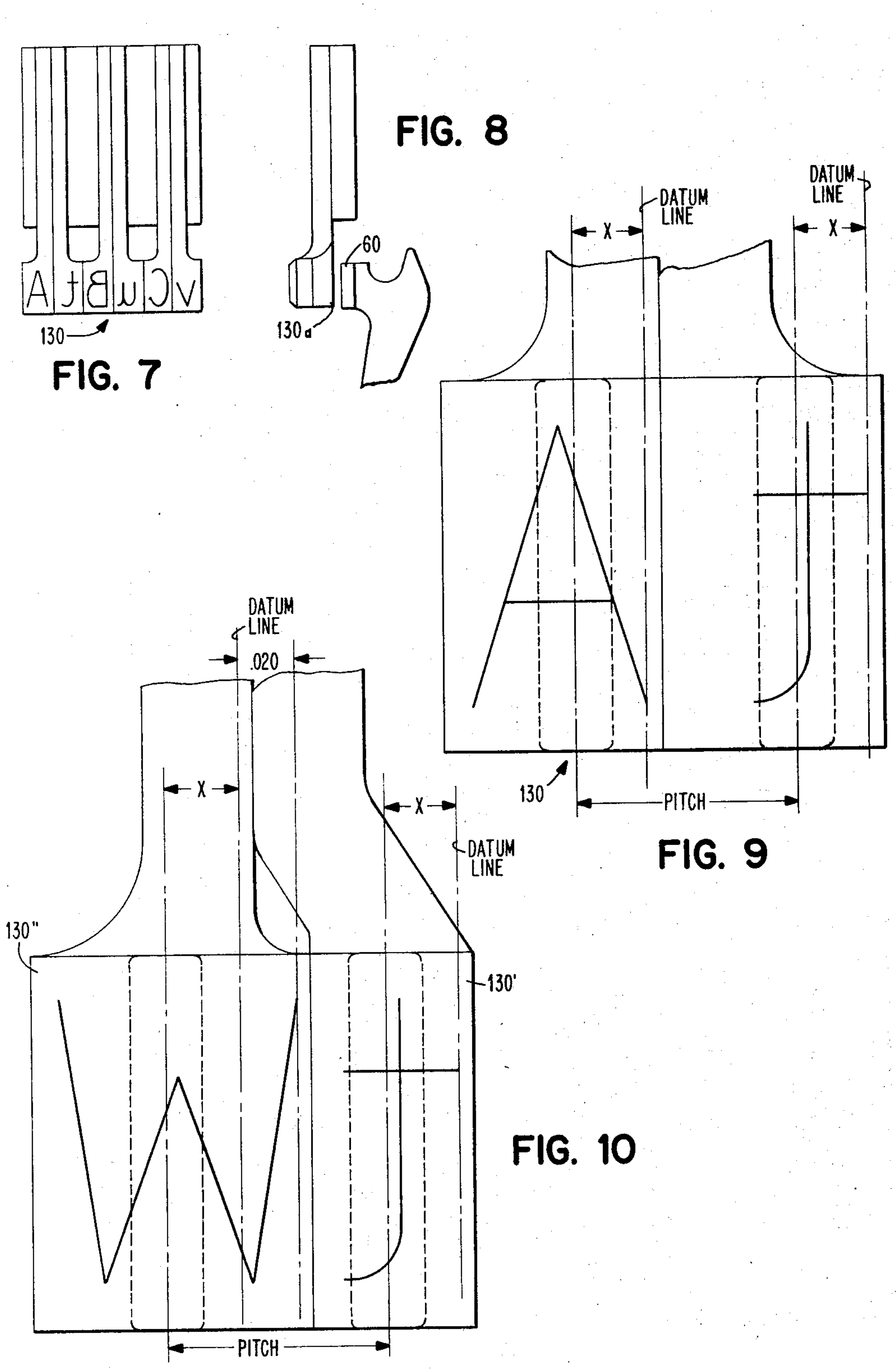
FIGURE 7 is a front elevational view showing a grouping of six type elements, of normal and/or narrow widths, in a carrier of a front printer.
FIGURE 8 is a partial side elevational view of the print elements of FIGURE 7 and related hammers.
FIGURE 9 is an enlarged partial view of adjacent characters on type elements of this type.
FIGURE 10 is an enlarged partial view of adjacent type elements in an embodiment using an off-set type element for extra-wide characters.

In FIGURE 7 there is shown a front view of an assembly of six .075 inch type slugs 130 arranged in a carrier. The anvils 130*a* at the rear of the type slugs as shown in FIGURE 8, and which receive the hammer impact from hammer 60 are approximately centered with the characters.

Referring to the enlarged view in FIGURE 9 it will be seen that the dimension X from the left-hand edge (the datum line) of a character to the center line of the anvil is constant. Because of the difference in width of the two characters, it is noted that the center of the impact is slightly to the left of the center of the letter "t" and slightly to the right of the letter "A."

In FIGURE 10 the typical slug 130′ for the "t" is shown with the material removed at the left side so that the adjacent slug 130″ can be wide enough to accommodate a .080 wide "W." Here it is noted that the left-hand edge of the "W" is .020 inch toward the letter "t" from the datum line, and violates the rule of keeping left-hand edges at a constant distance from the center line of the anvil; in fact the letter "W" would encroach on the space to its left and would off-print by .020 inch. To compensate for this condition, a .080 inch character that extends .020 inch to the left of the datum line must have an additional "modifier bit" in its space units code, the purpose of which is to modify its own proportional storage address, just before it is to be written into the proportional print storage 96, with the result that it, and all following characters, are delayed in entry until the next partial print line cycle when the document will have shifted .020 inch to the left, and the characters will print in the correct alignment. It will be noted that the center-line to center-line pitch of the anvils remains constant, and the letter "W" is off-center by the same amount as the letters "A" and "t." The modifier bits are read into the position in the core plane 84 corresponding to the respective character, along with the data representation and the space width value for the character. Readout of the modifier bits must be effected ahead of the data representation and the width values by using an earlier read time or having less delay in the sense amplifier and register circuits, sufficiently to advance the space units counter before a comparison is made of the value in the counter 100 with the position of the shift cam ring 105 for writing the character into the proportional storage, so as to defer the writing until the next position of the shift cam ring 105.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a high speed printer having means for moving a plurality of type characters continuously relative to a print line on a document and having a plurality of impact means for selectively effecting impact between the document and type characters,
   - data storage means for storing coded representations of characters to be printed on the document and their width values,
   - additional storage means for storing a representation of at least a portion of characters in the data storage means in accordance with their relative positions, according to their cumulative width values,
   - width counter means responsive to the width values of character representation in the data storage means,
   - moving means for effecting relative movement of the document and impact means to a plurality of positions, along the print line,
   - means for storing data representations in the additional storage means in accordance with the count of the width counter and the position of said moving means,
   - means producing a coded representation of the type member at different print positions,
   - compare means responsive to an identity between such coded representations produced and the representation in the additional storage means connected for effecting operation of an associated impact means, to print the character represented, and
   - means operable in response to printing characters for which representations are in the additional storage means for effecting operation of said moving means to effect relative movement of the document and impact printing means to another of said positions.

2. A printer in accordance with claim 1 characterized by the moving means being connected to effect movement of the document relative to the impact means.

3. A printer in accordance with claim 2 characterized by a counter connected to respond to operation of the moving means and effect advance of the document transverse to the print line to a new print line after a predetermined number of document moving means operations.

4. A printer in accordance with claim 3 characterized by the document moving means comprising a stepping motor operated device.

5. A printer in accordance with claim 4 characterized by the stepping motor operating a multilevel cam which controls the document positions along the print line.

6. A printer in accordance with claim 1 characterized by the addressing of the proportional storage means being jointly under the control of a system clock and the space units counter in entering representations into the proportional storage means, while the addressing is under the system clock and the print control read command during printing.

7. A printer in accordance with claim 1 characterized by means for producing signals in accordance with the position of the moving means and logic gate means responsive to said signals and the width counter for writing a cumulative space representation of a character in the additional storage means.

8. A printer in accordance with claim 1 characterized by the type having extra wide characters arranged in offset relation relative to adjacent characters and the data storage means has further storage means for storing modifier bits for such extra wide characters which bits are read out into the width counter means ahead of the regular width value for such characters so that the character is not printed until the moving means has operated to effect relative movement of the document and impact means to the next position.

References Cited

UNITED STATES PATENTS

| | | | |
|---|---|---|---|
| 2,933,437 | 7/1961 | Demer | 101—93 |
| 3,041,964 | 7/1962 | Simpson et al. | 101—93 |
| 3,066,601 | 12/1962 | Eden | 101—93 |
| 3,176,819 | 4/1965 | Bloom et al. | 197—133 |
| 3,224,366 | 12/1965 | Cunningham | 101—93 |
| 3,289,576 | 12/1966 | Bloom et al. | 101—93 |
| 3,303,775 | 2/1967 | Giannuzzi | 101—111 |
| 3,212,174 | 4/1967 | Cunningham | 101—93 |

WILLIAM B. PENN, *Primary Examiner.*